United States Patent [19]

DeRooij

[11] 3,852,272

[45] Dec. 3, 1974

[54] PROCESS FOR REMOVING LACTAMS

[75] Inventor: Abraham Hermanus DeRooij, Geleen, Netherlands

[73] Assignee: Stamicarbon N.V., Heerlen, Netherlands

[22] Filed: May 2, 1972

[21] Appl. No.: 249,642

[30] Foreign Application Priority Data

May 7, 1971 Netherlands.................... 7106343

[52] U.S. Cl.................. 260/239.3 A, 260/293.86, 260/326.5 FL
[51] Int. Cl............................................. C07d 41/06
[58] Field of Search 260/239.3 A, 293.86, 326.5 FL; 423/356, 525, 530, 541

[56] References Cited
UNITED STATES PATENTS

| | | | |
|---|---|---|---|
| 2,221,369 | 11/1940 | Cass............................ | 260/239.3 A |
| 2,605,261 | 7/1952 | Kahr........................... | 260/239.3 A |
| 2,737,511 | 3/1956 | Cohn........................... | 260/239.3 A |
| 2,993,889 | 7/1961 | Muytjens et al. ........... | 260/239.3 A |
| 3,275,407 | 9/1966 | Furkert et al................ | 423/356 |
| 3,292,996 | 12/1966 | Furkert et al................ | 423/356 |
| 3,321,275 | 5/1967 | Furkert et al................ | 423/356 |
| 3,336,298 | 8/1967 | DeRooij et al.............. | 260/239.3 A |
| 3,383,170 | 5/1968 | Furkert et al................ | 423/541 |
| 3,404,947 | 10/1968 | Miller et al. ................ | 23/1 |

FOREIGN PATENTS OR APPLICATIONS

| | | |
|---|---|---|
| 1,199,243 | 3/1966 | Germany |
| 1,206,404 | 7/1966 | Germany |
| 740,891 | 11/1955 | Great Britain................ 260/239.3 A |

OTHER PUBLICATIONS

Mellor, "Comp. Treatise on Inorganic and Theoretical Chemistry," Vol. 2, page 703, (Longmans, Green) (1922).

Primary Examiner—Henry R. Jiles
Assistant Examiner—Robert T. Bond
Attorney, Agent, or Firm—Cushman, Darby & Cushman

[57] ABSTRACT

A process for recovering lactam from a mixture of lactam and sulphuric acid is disclosed, wherein the mixture of lactam and sulphuric acid, such as that produced in a Beckmann rearrangement is partially neutralized and diluted by the addition of ammonia water. The amount of ammonia added is such that the molar ratio $$(NH_4)_2SO_4/(NH_4)_2SO_4 + H_2SO_4$$

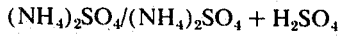

is about 0.30:1 to 0.65:1. The amount of water added is from 3 to about 10 moles of water per mole of sulphur trioxide originally present. The lactam is separated from the partially neutralized sulphuric acid by counter-current extraction with a water immiscible organic lactam solvent.

The production of ammonium sulphate as a byproduct is avoided, without requiring excessive dilution of the sulphuric acid, whereby recovery costs are reduced.

5 Claims, 3 Drawing Figures

PROCESS FOR REMOVING LACTAMS

BACKGROUND OF THE INVENTION

The present invention relates to the preparation of lactams, ssuch as ε-caprolactam, from the corresponding ketoximes, especially the recovery of the lactams so produced from the reaction medium.

Lactams are obtained from alicyclic oximes by an intramolecular rearrangement known as the Beckmann rearrangement, wherein rearrangement takes place in, and is catalyzed by, a highly acid medium. Suitable highly acid mediums include, in addition to sulphuric acid, other acid media such as phosphoric acid, a mixture of acetic acid and acetic anhydride, and a melt of ammonium hydrogen sulphate. However, in commercial practice in the rearrangement of cyclohexanone oxime to ε-caprolactam, the most important of the lactams now being produced on an industrial basis, 6 percent by weight oleum is generally used as the acid medium, in a ratio of 1 mole of dry oxime to 1.5 moles of sulphuric acid. Any traces of moisture present in the cyclohexanone oxime which is to be rearranged are removed by the free $SO_3$ in the oleum. Rearrangement in the oleum medium takes place at about 125°C to produce ε-caprolactam in a fast, continuous manner with very high process efficiencies.

This prior art process has a decided disadvantage in that the process involves the coproduction of ammonium sulphate. In order to be able to remove the lactam product from the sulphuric acid reaction medium, the prior art usually neutralizes the reaction medium with ammonia water to a pH value of about 4.5, to form two layers, with the upper layer consisting mainly of lactam floating on the ammonium sulphate solution, containing about 40 percent by weight of ammonium sulphate and only slight amounts of lactam. The two layers can be separated in a relatively simple manner, and lactam can be recovered from each of the layers by extraction.

In processes for recovering lactam of the above-described type, the sulphuric acid or oleum used as the acid medium for the rearrangement is fully converted into ammonium sulphate, resulting in about 1.7 to about 1.9 tons of by-product ammonium sulphate being produced per ton of ε-caprolactam product.

Ammonium sulphate is used as a fertilizer in tropical and subtropical regions, but the prospects of profitable sales are not encouraging as a result of reduced sales prices, particularly when considered in connection with the high transportation costs involved in transporting ammonium sulphate to tropical or subtropical regions from production locations in more temperate zones. As a result of the discouraging sales picture for ammonium sulphate, which has long been recognized, the prior art has sought methods to avoid the coproduction of ammonium sulphate in the recovery of lactam from a mixture of lactam and sulphuric acid.

According to one prior art method, the mixture of lactam and sulphuric acid is not neutralized, but is instead diluted with water, whereupon the lactam is extracted with a water-immiscible extracting agent. The resulting aqueous solution of sulphuric acid, which is substantially free of lactam, can again be used, after concentration, in the rearrangement of oximes to lactams. Chloroform is strongly preferred as the extracting agent, and in order to be able to efficiently extract with chloroform, U.S. Pat. No. 2,737,511 teaches that the mixture of lactam and sulphuric acid must first be diluted until a sulphuric acid content of 10 - 20 percent by weight, preferably 12 - 16 percent by weight, based on the amount of water present, is obtained. Coproduction of the undesired ammonium sulphate is avoided by such a process, but this process has the drawback in that it involves the production of highly diluted waste sulphuric acid. The concentration of this highly diluted waste sulphuric acid to the concentration required for the Beckmann rearrangement involves relatively high costs. It is impossible to convert such diluted waste sulphuric acid, e.g. a 15 weight percent waste sulphuric acid, into the 6 weight percent oleum used for the rearrangement of oximes to lactams. Evaporative concentration produces sulphuric acid having a concentration of no more than 98 percent by weight, which can be converted, by absorption of sulphur trioxide, into 6 weight percent oleum. However, using this approach much more oleum is produced than is required for the Beckmann rearrangement so that the by-product of the process is not 6 weight percent oleum instead of ammonium sulphate.

If such oleum coproduction is undesired, the waste acid may be decomposed into $SO_2$, $O_2$ and $H_2O$, and the $SO_2$ may be subsequently utilized in a sulphuric acid plant. The decomposition of waste acids can be accomplished by spraying the acid into a flame, such as a natural gas flame. In such instances, it is preferred that the acid sprayed into the flame is not excessively diluted, since all of the water in the acid solution must be evaporated in the flame.

Considering that the usual Beckmann rearrangement mixture contains 1.5 moles of sulphuric acid per mole of ε-caprolactam, and that it is necessary for this sulphuric acid to be diluted to about 15 weight percent in order to make the lactam extraction possible, it will be appreciated that about 46 moles of water are added per mole of caprolactam. Thus, the decomposition of the diluted waste sulphuric acid into gaseous $SO_2$, $O_2$ and $H_2O$ requires the evaporation of 30 moles of water per mole of sulphuric acid, which results in high combustion costs.

DESCRIPTION OF THE INVENTION

The present invention is directed to the reduction of the amount of water which must be evaporated in the decomposition of the waste sulphuric acid remaining after lactam extraction. The mixture of lactam and sulphuric acid is partially neutralized with ammonia water, and thereafter the lactam is extracted from a much less diluted solution due to the fact that the solution contains a smaller amount of free sulphuric acid. As the solution contains less water, the sulphuric acid solutions remaining after the lactam extraction are easily decomposed into $SO_2$ at lower costs.

Thus, the process of the present invention reduces the amount of water which must be evaporated in the decomposition of the diluted waste acid remaining after the lactam extraction step. The lactams which are produced from the corresponding oximes and which are recovered by the process of the present invention are generally lactams having from 4 to 12 carbon atoms, with ε-caprolactam being decidedly preferred. Other lactams which can be recovered by the process of the present invention include e.g. butyrolactam, valerolactam, oenantholactam and laurinolactam.

The mixture of lactam and sulphuric acid produced by a Beckmann rearrangement is partially neutralized and diluted with an amount of ammonia and water such that the molar ratio $$\eta = (NH_4)_2SO_4/((NH_4)_2SO_4 + H_2SO_4)$$

in the solution which is to be extracted has a value within the range of from 0.30:1 to 0.65:1, and that the water content of the solution to be extracted is no more than 10 moles of water per mole of sulphur trioxide originally present in the lactam-sulphuric acid mixture in the form of free sulphur trioxide and in the form of sulphur trioxide bound as sulphuric acid.

Upon extraction of the lactam from such partially neutralized and diluted solutions, a relatively concentrated solution of ammonium sulphate and free sulphuric acid will be obtained. Generally, the concentration of ammonium sulphate and sulphuric acid in such solutions will amount to about 50 percent weight total, although with certain embodiments of the process of the present invention, this concentration can be raised, e.g. to 60 percent by weight or even higher. These relatively concentrated solutions can be decomposed into $SO_2$, $O_2$, $N_2$ and $H_2O$ by combustion, for instance, in a natural gas flame, at less expense than would be the case if the lactam extraction had involved sulphuric acid solutions which had not been partially neutralized. During the combustion of such relatively concentrated solutions, ammonia will be lost in the form of $N_2$, but this loss is not significant as the solutions are already relatively concentrated, and also in that the ammonia partly satisfies the fuel requirements.

The lactam-sulphuric acid mixture obtained from the Beckmann rearrangement is conveniently neutralized at ambient conditions, although higher and lower temperatures and pressures, e.g. 40° to 10°C and 2 to 1 atmospheres, can be used if desired. The amount of water added in the neutralization step will generally be at least 3 mole per mole of sulphur trioxide present (in the form of free sulphur trioxide and in the form of sulphur trioxide bound as sulphuric acid), and preferably the amount of water is about 3 to about 6 moles per mole of sulphur trioxide.

The lactam can be extracted from the neutralized solution using conventional extraction agents. For instance, aromatic hydrocarbons, especially those aromatic hydrocarbons having six to eight carbon atoms, such as benzene and toluene, may be used to extract lactams from solutions which have been neutralized to a point where the acidity is not too great, whereas for solutions which are still strong acid, chloroform and other chlorinated hydrocarbons, especially chlorinated alkanes of 1 – 3 carbon atoms, such as 1,2-dichloroethane or 1,1,2,2-tetrachloroethane, are preferred. The extraction is conveniently accomplished under ambient conditions although higher or lower temperatures and pressures may be used, e.g. temperatures of 40° to 20°C and pressures of 2 to 1 atmospheres may be used if desired. The molar ratio of the extraction solvent to the lactam will normally be at least 3:1, in order to insure adequate extraction. There is no upper limit to this molar ratio, but it will be appreciated that for practical reasons, generally this ratio will be no greater than about 40:1.

After the lactam has been extracted from the neutralized solution, the remaining solution of ammonium sulphate and sulphuric acid, which normally has a concentration of about 50 to 65 weight percent, may be suitably decomposed into $N_2$, $SO_2$, $O_2$ and $H_2O$ through combustion in a natural gas flame. The resulting gas mixture may be used as a feed stock in a sulphuric acid plant for the preparation of oleum.

It is also possible to recover, instead of $SO_2$, $SO_3$ and $NH_3$ from the concentrated solution of ammonium hydrogen sulphate. In this embodiment, the solution is evaporated until an ammonium hydrogen sulphate melt is obtained. This melt is subjected to conventional processing. For instance, the melt can be converted with the aid of a suitable metal oxide, such as ZnO, into ammonia water, and metal sulphate, e.g. zinc sulphate, at a somewhat elevated temperature (e.g. 300° to 500°C), and thereafter the metal sulphate can be decomposed into metal oxide and sulphur trioxide at elevated temperatures (e.g. 850° to 1,200°C). Thus sulphur trioxide is directly recovered, and such sulphur trioxide may be used in the Beckmann rearrangement. This recovery of sulphur trioxide is particularly attractive if the Beckmann rearrangement of oximes takes place using liquid sulphur dioxide as a reaction solvent and sulphur trioxide as the acid reaction agent. In such a Beckmann rearrangement, the sulphur dioxide is normally evaporated off after the rearrangement, and the mixture of lactam and sulphur trioxide remaining is converted with water into a mixture of lactam and sulphuric acid, which mixture can then be subjected to the process of the present invention to recover lactam therefrom.

DESCRIPTION OF THE DRAWINGS

The process of the present invention will be understood more readily with reference to the accompanying drawings wherein

In FIG. 1, mixing vessel A is supplied with a mixture of lactam and sulphuric acid from a Beckmann rearrangement (not shown) through line 1. Mixing vessel A is also supplied with dilution water through line 2 and gaseous ammonia through line 3. These streams are mixed in mixing vessel A and the resulting partially neutralized diluted solution is introduced into extraction column B via line 4. In extraction column B, the partially neutralized solution is counter-currently extracted with an extracting agent supplied through line 5. The extracting agent passing out of extraction column B contains extracted lactam, and flows through line 6 to separator C. In separating unit C, the lactam and the extracting agent are separated by evaporation and/or water washing. The extracting agent is recycled to extraction column B through line 5, and the lactam produced is discharged through line 7.

An aqueous solution of ammonium sulphate and sulphuric acid, essentially free of lactam, is discharged from the top of extraction column B through line 8, and is subsequently further processed, such as by combustion in an open gas flame (not shown).

Figure 1:
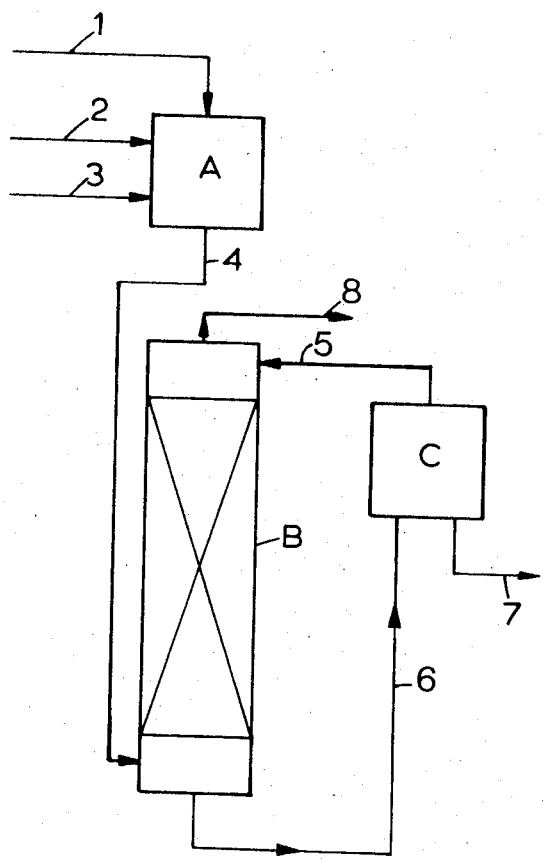
FIG. 1 is a process diagram of a one-stage extraction process of the present invention.
Figure 2:
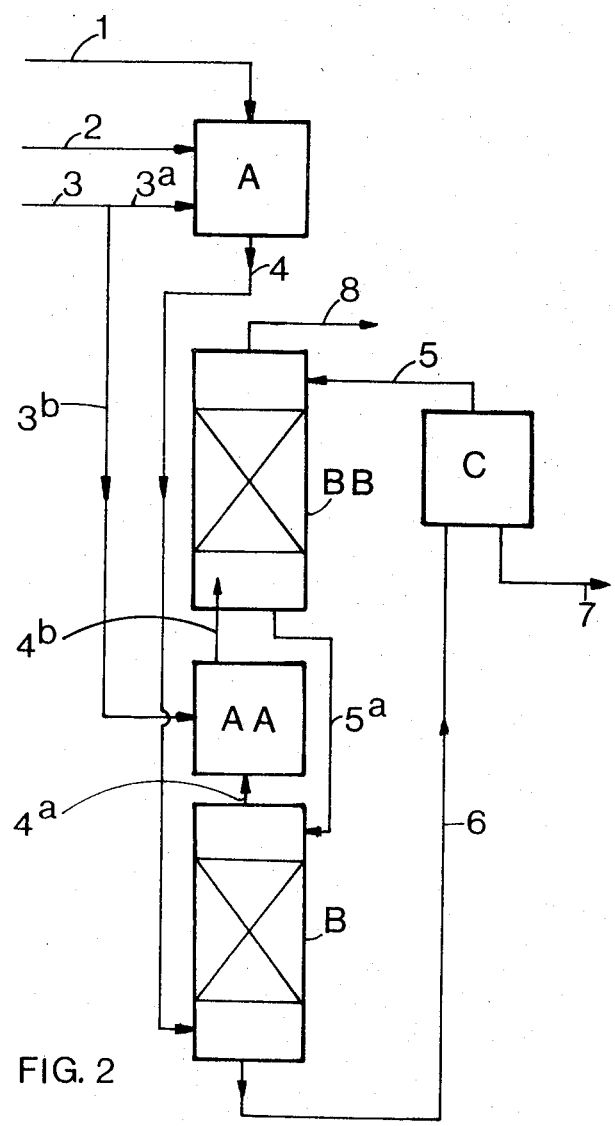
FIG. 2 is a flow diagram of a two-stage extraction process, using a two-stage neutralization step, of the present invention.

In FIG. 2 the extraction column B of FIG. 1 has been replaced by extraction columns B and BB, and a second mixing vessel AA has been arranged between these two extraction columns.

In the first mixing vessel A, the partial neutralization of the lactam-sulphuric acid mixture introduced via line 1 takes place to a lesser degree, for instance, from one-half to two-thirds of the degree of neutralization desired, with the aid of ammonia introduced through line 3a. The final desired degree of partial neutralization is reached in second mixing vessel AA by way of additional ammonia introduced into line 3b.

In first extraction unit B, incomplete extraction occurs because the solution which is to be extracted still has too high an acidity. The extraction is completed in second extraction column BB, which communicates with first extraction column B by way of line 4a, second mixing vessel AA, and line 4b. Extraction column B and BB are also in communication by way of line 5a, through which the extracting agent flows.

The process represented by FIG. 2 can be used to advantage if very low dilution of the original mixture of lactam and sulphuric acid is desired. For instance, the process of FIG. 2 can be used with the addition of less than 5 moles of water per mole of sulphuric acid originally present in the Beckmann rearrangement mixture, so that the sulphuric acid will eventually be recovered in the form of a highly concentrated solution containing ammonium sulphate and sulphuric acid. If the neutralization should be conducted in a single stage, solid phases or two liquid phases will form, which would render extraction more difficult. This is avoided, however, by first partially neutralizing to a less than desired total degree of neutralization, then extracting lactam from this partially neutralized solution with extracting agent which is already loaded with lactam and which originates from a previous extraction stage where the remainder of the lactam is extracted with fresh extracting agent from the solution which has been neutralized to the desired total degree, generally about the level of a bisulphate composition.

When practicing the process embodiment of FIG. 2, normally about one-half to two-thirds of the total amount of $NH_3$ introduced to the process via line 3 will be fed to the first mixing vessel A through line 3a, and about one-third to one-half of the $NH_3$ flow will be introduced into second mixing vessel AA through line 3b. It is possible, of course, to use even less or more neutralization in the first mixing vessel A, but the partial neutralization mentioned above is greatly preferred.

Although the process represented by FIG. 2 does yield a highly concentrated lactam-free solution of ammonium bisulphate, having a concentration of over 60 weight percent, as opposed to the about 50 weight percent concentration of the solution obtained by the process of FIG. 1, it does have the disadvantage that the solution of lactam in the extraction agent obtained has a relatively low concentration, e.g. in the order of three parts by weight of lactam to 100 parts of weight of extraction agent, whereas the process of FIG. 1 produces a lactam solution of about 25 percent concentration flowing through line 6.

Figure 3:
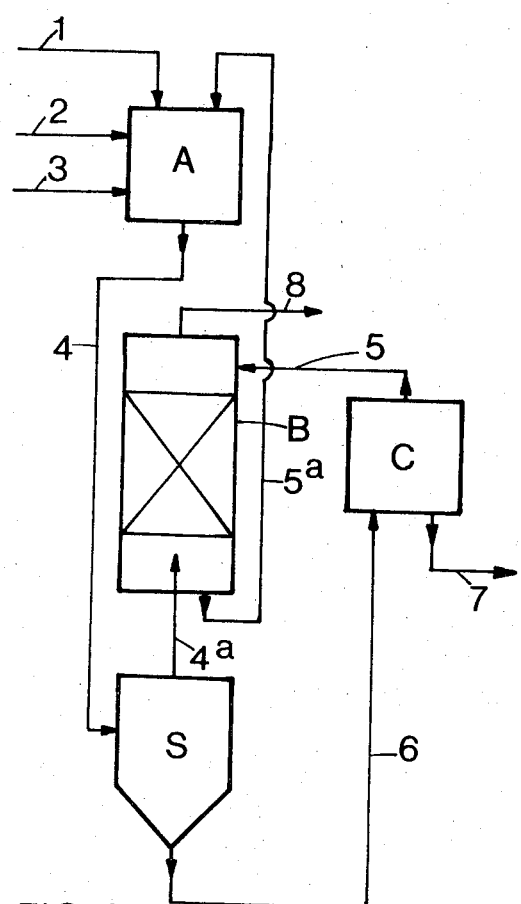
FIG. 3 is a flow diagram of a one-stage extraction system wherein a preliminary phase separation is performed on the mixture to be extracted.

The process represented by FIG. 3 produces a considerably higher concentration of lactam in the extraction agent, in combination with a highly concentrated bisulphate solution which is free of lactam. The flow diagram of FIG. 3 differs from those of FIGS. 1 and 2 in that in mixing vessel A extracting agent is present, so that a part of the lactam is already extracted from the solution when the acidity of the solution has been decreased to the point of an ammonium bisulphate composition. The extraction agent is introduced into mixing vessel A through line 5a. Mixing vessel A is connected to separator S through line 4. In separator S, two phases formed in mixing vessel A are separated, one phase being lactam-laden extraction agent, and the other phase being an ammonium bisulphate solution containing some lactam.

The solution of ammonium sulphate, still containing some lactam, is supplied to extraction column B through line 4a. In extraction column B, this solution is counter-currently extracted with extraction agents supplied through line 5. the lactam-laden extraction agent passing through extraction column B is supplied to mixing vessel A through line 5a.

The lactam-laden extraction agent phase separated in separator S is passed through line 6 to extraction unit, or separating unit, C, wherein the lactam is extracted from the extraction agent in the same manner as in the processes of FIGS. 1 and 2. Product lactam is discharged through line 7, and the extraction agent is supplied to extraction column B through line 5.

The process embodiment of FIG. 3 has the additional advantage that the reduction of acidity of the lactam-sulphuric acid mixture in mixing vessel A can be conducted at a somewhat higher temperature. In conventional neutralization of the mixture of lactam and sulphuric acid, it is known that the temperature should be maintained at a relatively low level, because of the danger of lactam losses through hydrolysis at more elevated temperatures. On the other hand, of course, it is imperative that the temperature be maintained above the level at which crystallization occurs. In practice, it has generally been desirable to maintain the temperature in the mixing vessel A at about 25°C, but maintenance of this temperature is sometimes most difficult, especially in warmer climates wherein such temperature control can hardly be effected by cooling water alone so that the contents of the mixing vessel A would have to be subjected to refrigeration or the like, which is very costly and which is sought to be avoided.

In the process embodiment represented by FIG. 3, by far the greater part of the lactam present in mixing vessel A is immediately transferred to the extraction agent during the neutralization step, so that this lactam which is in solution in the extraction agent has some protection from hydrolysis. In view of this, the temperature in mixing vessel A can be maintained at a higher level, for instance, in the order of about 35°C, and at this level the heat released can generally be removed by normal cooling water means, even in warmer climates.

EXAMPLES OF THE INVENTION

The invention will be understood more readily by reference to the following examples; however, these examples are intended to illustrate the invention and are not to be construed to limit the scope of the invention.

Example 1

A two-stage extraction system, as represented by FIG. 2, was used in this Example. Mixing vessel A was supplied with a mixture of 100 moles/hour of $\epsilon$-caprolactam and 150 moles/hour of sulphuric acid, which mixture was the product produced by a previous Beckmann rearrangement, through line 1. Mixing vessel A was also supplied with 516 moles/hour of water through line 2 and 75 moles/hour of $NH_3$ through line 3a. The different streams supplied to mixing vessel A were mixed at a temperature of 30°C to produce a solution containing 31 percent by weight of lactam, having a neutralization degree of 0.25 and a water content of 3.44 moles of water per mole of sulphuric acid supplied to mixing vessel A. This solution was passed to extraction unit B through line 4.

In extraction unit B the solution from mixing vessel A was countercurrently extracted at a temperature of 30°C and at atmospheric pressure with 3,050 moles/hour of chloroform supplied through line 5a. The chloroform supplied through line 5a also contained 10 moles/hour of lactam extracted in extraction unit BB. In extraction unit B, 90 additional moles/hour of lactam were extractd by the chloroform. A solution of 100 moles/hour of lactam and 3,050 moles/hour of chloroform (i.e. a chloroform solution containing 3 percent by weight of lactam) was discharged from extraction unit B via line 6 to separating unit C.

The lactam was separated from the chloroform solution in separating unit C after a previous neutralization by evaporation of the greater part of the chloroform by atmospheric pressure at 120°C followed by an extraction with water of the remaining concentrated solution of lactam in chloroform, 100 moles/hour of lactam in the form of a 30 percent by weight aqueous solution being discharged through line 7 and 3,050 moles/hour of chloroform being supplied via line 5 to extraction unit BB.

The solution discharged from extraction unit B is supplied via line 4a to neutralization vessel AA contained 10 moles/hour of lactam, 37.5 moles/hour of $(NH_4)_2SO_4$, 112.5 moles/hour of $H_2SO_4$, and 516 moles/hour of $H_2O$. In neutralization vessel AA the solution was further neutralized by the addition of 75 moles/hour of $NH_3$ supplied via line 3b. The neutralized solution was supplied to extraction unit BB via line 4b.

In extraction unit BB, the neutralized solution was countercurrently extracted at a temperature of 30°C and atmospheric pressure with chloroform supplied through line 5. A solution containing no lactam was discharged through line 8. This solution contained 75 moles/hour of $(NH_4)_2SO_4$, 75 moles/hour of $H_2SO_4$, and 516 moles/hour of $H_2O$, representing a 65 percent by weight solution of ammonium hydrogen sulphate which was decomposed by combustion in a natural gas flame.

Example 2

This example relates to the use of the apparatus of FIG. 3. Mixing vessel A was supplied through line 1 with a mixture of 100 moles/hour of ε-caprolactam and 150 moles/hour of sulphuric acid, which mixture was previously obtained from a Beckmann rearrangement. In addition, mixing vessel A was supplied with 640 moles/hour of water through line 2 and 150 moles/hour of $NH_3$ through line 3. 536 moles/hour of chloroform, containing 19 moles/hour of dissolved lactam, were supplied to mixing vessel A through line 5a. A heterogeneous mixture was discharged from mixing vessel A through line 4 to separator S, wherein two layers were formed. The upper layer, containing 19 moles/hour of lactam, 150 moles/hour of ammonium hydrogen sulphate ($NH_4HSO_4$) and 640 moles/hour of water, was passed through line 4a to extraction column B, wherein it was extracted at a temperature of 35°C with a countercurrent flow of 536 moles/hour of chloroform supplied through line 5. The bottom layer of separator S, which was a solution of 100 moles/hour of lactam in 536 moles/hour of chloroform (i.e., a 14.6 weight percent solution of lactam in chloroform) was supplied to separating unit C via line 6. In separating unit C the solution of lactam in chloroform was separated by extraction with water and 100 moles/hour of product lactam in the form of an aqueous solution were discharged through line 7, and 536 moles/hour of chloroform were recycled to extraction column B via line 5.

A solution essentially free of lactam was discharged from the top of extraction column B. This solution contained 75 moles/hour of $(NH_4)_2SO_4$, 75 moles/hour of $H_2SO_4$, and 640 moles/hour of $H_2O$, corresponding to a 60 weight percent ammonium hydrogen sulphate solution, and was discharged from the system through line 8 and subsequently decomposed by combustion in a natural gas flame.

What is claimed is:

1. In a process for recovering lactam from a mixture of lactam and sulphuric acid, said process comprising countercurrently extracting lactam from said mixture with a water-immiscible organic lactam solvent, the improvement comprising partly neutralizing and diluting said mixture of lactam and sulphuric acid by the addition of ammonia and water, wherein the amount of ammonia added is such that the molar ratio

in the resulting partially neutralized solution is about 0.30:1 to 0.65:1, and wherein the amount of water added is between about 3 and about 10 moles of water per mole of sulphur trioxide originally present in the form of free sulphur trioxide and in the form of sulphur trioxide bound as sulphuric acid and, after the lactam is removed from the mixture, thermally decomposing the remainder of the mixture to produce a gas containing $SO_2$ and/or $SO_3$.

2. Process according to claim 1, wherein the neutralization is conducted in two stages, the first neutralization stage involving the addition of all of the dilution water and one-half to two-thirds of the ammonia, thereafter the solution from the first neutralization stage is incompletely extracted in a first extraction by said solvent to form a solvent phase and a sulphuric acid/ammonium sulphate phase, thereafter the remainder of said ammonia is added in a second neutralization stage to the sulphuric acid/ammonium sulphate phase, and thereafter the lactam in said second neutralization stage solution is extracted in a second extraction with said solvent, the solution of lactam in said solvent produced by the second extraction being used to extract lactam in the first extraction.

3. Process according to claim 1, wherein the partial neutralization of the mixture of lactam and sulphuric acid is conducted in the presence of said solvent, and the resulting mixture from said partial neutralization is subsequently separated into two phases, one phase comprising said solvent containing at least most of said lactam, and the other phase comprising an aqueous solution of ammonium sulphate and sulphuric acid.

4. Process according to claim 3, wherein lactam is recovered from said aqueous phase by extraction therefrom with said solvent.

5. Process according to claim 1, wherein said lactam is caprolactam.

* * * * *